(12) United States Patent
Refsdal et al.

(10) Patent No.: US 10,863,606 B2
(45) Date of Patent: *Dec. 8, 2020

(54) CAUSING A BRIGHTNESS LEVEL OF A LIGHT TO CHANGE

(71) Applicant: Verizon Patent and Licensing Inc, Arlington, VA (US)

(72) Inventors: Brian Refsdal, Menlo Park, CA (US); Nick G. Suizo, San Jose, CA (US); Udit Batra, Fremont, CA (US); Kent Ryhorchuk, Menlo Park, CA (US); David Vucich, Cupertino, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/811,425

(22) Filed: Mar. 6, 2020

(65) Prior Publication Data

US 2020/0214111 A1     Jul. 2, 2020

Related U.S. Application Data

(63) Continuation of application No. 16/171,071, filed on Oct. 25, 2018, now Pat. No. 10,609,784.

(51) Int. Cl.
*H05B 47/11*     (2020.01)

(52) U.S. Cl.
CPC ................... *H05B 47/11* (2020.01)

(58) Field of Classification Search
None
See application file for complete search history.

(56) References Cited

U.S. PATENT DOCUMENTS

| | | | | |
|---|---|---|---|---|
| 6,528,954 B1* | 3/2003 | Lys | ....................... | H05B 47/18 315/291 |
| 8,543,249 B2* | 9/2013 | Chemel | ................... | H05B 47/19 700/295 |
| 8,928,232 B2* | 1/2015 | Aggarwal | ............ | H05B 47/175 315/153 |
| 9,006,996 B2* | 4/2015 | Mohan | ................... | H05B 47/11 315/307 |
| 9,078,305 B2* | 7/2015 | Pelton | ................... | H05B 47/175 |
| 9,084,308 B2* | 7/2015 | Morrow | ................ | H05B 47/10 |

(Continued)

*Primary Examiner* — Amy Cohen Johnson
*Assistant Examiner* — Srinivas Sathiraju

(57) ABSTRACT

A server device can periodically obtain information concerning illuminance of ambient light from light sensors associated with light sources, and can obtain respective brightness level values associated with respective brightness levels of the light sources. The server device can calculate an illuminance value associated with the illuminance of the ambient light based on the information, determine an adjusted brightness level value for the light sources based on the illuminance value, and determine transition times and transition rates based on the respective brightness level values and the adjusted brightness level value. The server device can cause the respective brightness levels to change according to the adjusted brightness level value, the transition times, and the transition rates, where the transition times and the transition rates are to be used to transition the respective brightness levels of the light sources from the respective brightness level values to the adjusted brightness level value.

20 Claims, 7 Drawing Sheets

(56) References Cited

U.S. PATENT DOCUMENTS

| | | | |
|---|---|---|---|
| 9,113,514 B2* | 8/2015 | Wang | H05B 33/08 |
| 9,166,884 B2* | 10/2015 | Suizo | H04L 67/24 |
| 9,351,378 B2* | 5/2016 | Aggarwal | H05B 47/175 |
| 9,386,665 B2* | 7/2016 | Nelson | H05B 47/175 |
| 9,510,426 B2* | 11/2016 | Chemel | H05B 47/16 |
| 9,538,612 B1* | 1/2017 | Reed | H05B 47/10 |
| 9,655,217 B2* | 5/2017 | Recker | H05B 45/20 |
| 9,730,298 B2* | 8/2017 | Vangeel | H04L 67/34 |
| 9,756,706 B2* | 9/2017 | Breuer | G08C 17/02 |
| 9,781,794 B1* | 10/2017 | Modi | H05B 47/175 |
| 9,860,965 B2* | 1/2018 | Recker | H02J 9/02 |
| 9,877,373 B2* | 1/2018 | Middleton-White | H05B 47/175 |
| 9,907,147 B2* | 2/2018 | Chen | F21V 23/0442 |
| 9,927,249 B2* | 3/2018 | Barnard | H04W 4/38 |
| 9,936,565 B2* | 4/2018 | Nelson | H05B 47/105 |
| 10,034,359 B2* | 7/2018 | Recker | H02J 13/00017 |
| 10,045,427 B2* | 8/2018 | Vangeel | H04W 8/26 |
| 10,085,327 B2* | 9/2018 | Recker | H05B 47/11 |
| 10,117,314 B2* | 10/2018 | Vangeel | H04L 12/282 |
| 10,129,965 B2* | 11/2018 | Bosua | H05B 45/20 |
| 10,321,547 B1* | 6/2019 | Recker | H05B 47/19 |
| 10,609,784 B1* | 3/2020 | Refsdal | H05B 47/11 |
| 2009/0113043 A1* | 4/2009 | Suizo | H04L 67/24 709/224 |
| 2014/0021867 A1* | 1/2014 | Shah | G05B 19/042 315/152 |
| 2014/0028199 A1* | 1/2014 | Chemel | H05B 47/11 315/152 |
| 2014/0097758 A1* | 4/2014 | Recker | H05B 47/19 315/152 |
| 2014/0097759 A1* | 4/2014 | Verfuerth | H05B 47/105 315/152 |
| 2014/0184083 A1* | 7/2014 | Pelton | H05B 47/11 315/152 |
| 2014/0293993 A1* | 10/2014 | Ryhorchuk | H04L 67/12 370/350 |
| 2014/0354161 A1* | 12/2014 | Aggarwal | H05B 47/105 315/153 |
| 2015/0369618 A1* | 12/2015 | Barnard | H04W 4/70 701/491 |
| 2016/0094088 A1* | 3/2016 | Bjorn | H05B 47/105 315/161 |
| 2016/0095191 A1* | 3/2016 | Vangeel | H04L 12/282 315/294 |
| 2016/0286629 A1* | 9/2016 | Chen | F21V 5/045 |
| 2017/0339178 A1* | 11/2017 | Mahaffey | H04L 67/16 |
| 2018/0054874 A1* | 2/2018 | Hunter | H04M 1/185 |
| 2018/0132334 A1* | 5/2018 | Middleton-White | H05B 47/155 |

* cited by examiner

CAUSING A BRIGHTNESS LEVEL OF A LIGHT TO CHANGE

RELATED APPLICATION

This application is a continuation of U.S. patent application Ser. No. 16/171,071, filed Oct. 25, 2018, which is incorporated herein by reference.

BACKGROUND

Daylight harvesting is an energy management technique to reduce or minimize a light source's power usage based on the brightness of ambient light around the light source. The light source can include a light sensor to capture the ambient light, which can be analyzed to determine a preferred brightness level for a light associated with the light source.

DETAILED DESCRIPTION OF PREFERRED EMBODIMENTS

Figure 1A:
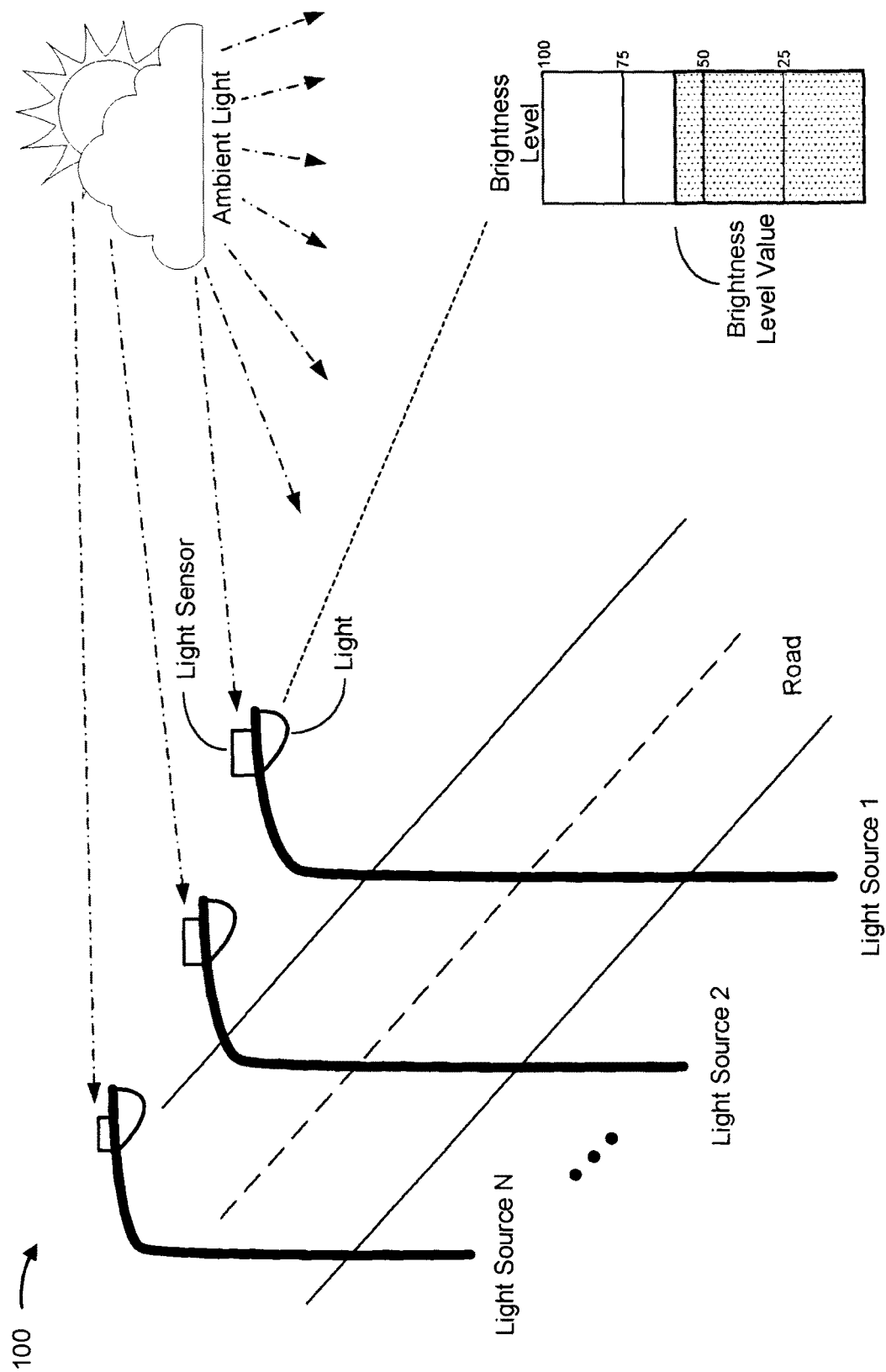
FIGS. 1A-1D are example diagrams of example implementations described herein.

The following detailed description of example implementations refers to the accompanying drawings. The same reference numbers in different drawings can identify the same or similar elements.

A server can track ambient light conditions for a group of light sources. A light source of the group of light sources can have a light that emits light at a brightness level and a light sensor that captures ambient light information. The light source can transmit the ambient light information to the server, which can determine illuminance information concerning the ambient light. In some cases, the server can determine a preferred brightness level for the light of the light source based on the illuminance information. The server can direct the light source to change the brightness level of the light from a current brightness level to the preferred brightness level. However, in some cases, a sudden change to the brightness level can cause sudden "pops" of light that can be distracting and/or dangerous to vehicle operators, pedestrians, livestock, and/or the like. Moreover, in some cases, such as on a partly-cloudy day, the server can cause the light source to continually change the brightness level of the light, which can cause "flashing" of light that can be just as distracting and/or dangerous as the "pops" of light. Continually changing the brightness level can also lead to unnecessary power consumption by the light source.

Some implementations, described herein, provide a monitoring platform that calculates an illuminance value associated with an illuminance of the ambient light collected by one or more light sources, determines an adjusted brightness level value for the one or more light sources based on the illuminance value, and causes respective brightness levels of the one or more light sources to gradually change, so as to not startle vehicle operators, pedestrians, livestock, and/or the like. According to some implementations, the monitoring platform determines one or more transition times and one or more transition rates based on differences between the adjusted brightness level value and current respective brightness level values associated with the respective brightness levels of the one or more light sources. In some implementations, the one or more transition times and the one or more transition rates are to be used to transition the respective brightness levels of the one or more light sources from the respective brightness level values to the adjusted brightness level value.

In this way, some implementations described herein provide the monitoring platform with information that can be used to optimally change settings and configurations related to the respective brightness levels of the one or more light sources. Moreover, some implementations described herein can allow the monitoring platform to determine and/or configure brightness level changing protocols, which can prevent or reduce the "pops" of lights and/or the "flashing" of light that create distracting and/or dangerous conditions. This can result in the increased safety of the vehicle operators, pedestrians, livestock, and/or the like. This can also result in less power consumption by the one or more light sources, which can reduce costs associated with powering the one or more light sources.

Furthermore, implementations described herein are automated and can capture and process numerous (e.g., hundreds, thousands, millions, billions, and/or the like) data points to determine relationships for one or more transition times and/or one or more transition rates in regard to respective brightness level values and adjusted brightness level values (e.g., hundreds, thousands, millions, and/or the like) at the same time. This can improve speed and efficiency of the process and conserve computing resources (e.g., processor resources, memory resources, and/or the like) of the monitoring platform and/or the client device. Furthermore, implementations described herein use a rigorous, computerized process to perform tasks or roles that were not previously performed or were previously performed using subjective human intuition or input. For example, currently there does not exist a technique to automatically collect information concerning respective brightness level values and adjusted brightness level values to determine a relationship between respective brightness level values and adjusted brightness level values for calculating one or more transitions times and/or one or more transition rates. Finally, implementations described herein conserve computing resources (e.g., processor resources, memory resources, and/or the like) that would otherwise be wasted in attempting to assist a human in collecting respective brightness level values and adjusted brightness level values, determining a relationship for one or more transition times and/or one or more transition rates in regard to respective brightness level values and adjusted brightness level values, and calculating one or more transitions times and/or one or more transition rates location data based on the relationship by hand.

FIGS. 1A-1D are diagrams of example implementations 100 described herein. In some implementations, example implementation 100 can include a light source, a monitoring platform, and a client device. In some implementations, the light source, the monitoring platform, and/or the client device can be connected via a network, such as the Internet, an intranet, and/or the like. In some implementations, the light source can communicate with the monitoring platform via a wireless connection, such as a cellular connection. In some implementations, the light source can communicate with the monitoring platform via the cellular connection through a base station. Some example implementations described herein concern a single light source, but implementations can include a plurality of light sources.

In some implementations, the client device can communicate with the light source and/or the monitoring platform via the network. In some implementations, the client device can obtain information about the light source (e.g. status information about the light source) and/or information about the monitoring platform (e.g., status information about the monitoring platform, status information about one or more light sources that the monitoring platform is monitoring, and/or the like). In some implementations, the client device can cause display of the information about the light source and/or the information about the monitoring platform to a user.

As shown in FIG. 1A, example implementation 100 can include a plurality of light sources (e.g., one or more groups of light sources that are monitored by the monitoring platform). In some implementations, the plurality of light sources can be located in a similar environment, such as along one or more roads and/or highways, throughout a community (e.g., a neighborhood, a city, and/or the like), throughout one or more utilities (e.g., an airport, an electricity generation plant, a wastewater plant, and/or the like), around one or more parking lots, around one or more buildings (e.g., a housing complex, a college campus, and/or the like), around one or more physical structures (e.g., monuments, statues, and/or the like), and/or the like. In some implementations, the plurality of light sources can be divided into one or more groups of light sources.

In some implementations, a light source can include a light sensor (e.g., a photocell, a photo resistor, a photovoltaic cell, and/or the like). Some example implementations described herein concern a light source with a single light sensor, but implementations can include a light source with a plurality of light sensors. As shown in FIG. 1A, in some implementations, the light sensor can detect ambient light (e.g., available light in an environment around the light sensor; available light in the environment around the light sensor associated with daylight conditions; light that is direct, reflected, refracted, and/or the like from another light source available in the environment around the light sensor; and/or the like). In some implementations, the light sensor can collect ambient light information, such as information concerning luminance of the ambient light, information concerning brightness of the ambient light, information concerning illuminance of the ambient light, and/or the like. In some implementations, the light source can obtain (e.g., receive, fetch, collect, capture, and/or the like) the ambient light information from the light sensor. In some implementations, the light source can obtain the ambient light information from the light sensor when the light sensor detects that the ambient light satisfies a threshold (e.g., the available light in the environment around the light sensor is greater than an ambient light level threshold, the available light in the environment around the light sensor is less than an ambient light level threshold, and/or the like).

In some implementations, the light source can include a light, such as a halogen light, an incandescent light, a compact fluorescent (CFL) light, a light emitting diode (LED) light, a florescent light, a neon light, and/or the like. Some example implementations described herein concern a light source with a single light, but implementations can include a light source with a plurality of lights. In some implementations, the light has a brightness level associated with a brightness of the light. In some implementations, the light source can collect a brightness level value that indicates the brightness level of the light. As shown in FIG. 1A, in some implementations, the brightness level value can conform to a scale, such as a scale from 0 to 100, in increments of 0.5, 1, 5, and/or the like. In some implementations, a minimum brightness level value (e.g., a brightness level value of 0) indicates that the light is turned off and not emitting light, a maximum brightness level value (e.g., a brightness level value of 100) indicates that the light is turned on and emitting a maximum amount of light that the light is capable of emitting, and a particular brightness level value of a range of brightness level values between the minimum brightness level value and the maximum brightness level value (e.g., a brightness level value of 20, 25, 50, 62, 78.5, 93, and/or the like) indicates that the light is turned on and emitting a particular amount of light. In some implementations, the light source can obtain (e.g., receive, fetch, collect, capture, and/or the like) the brightness level value from the light.

Figure 1B:
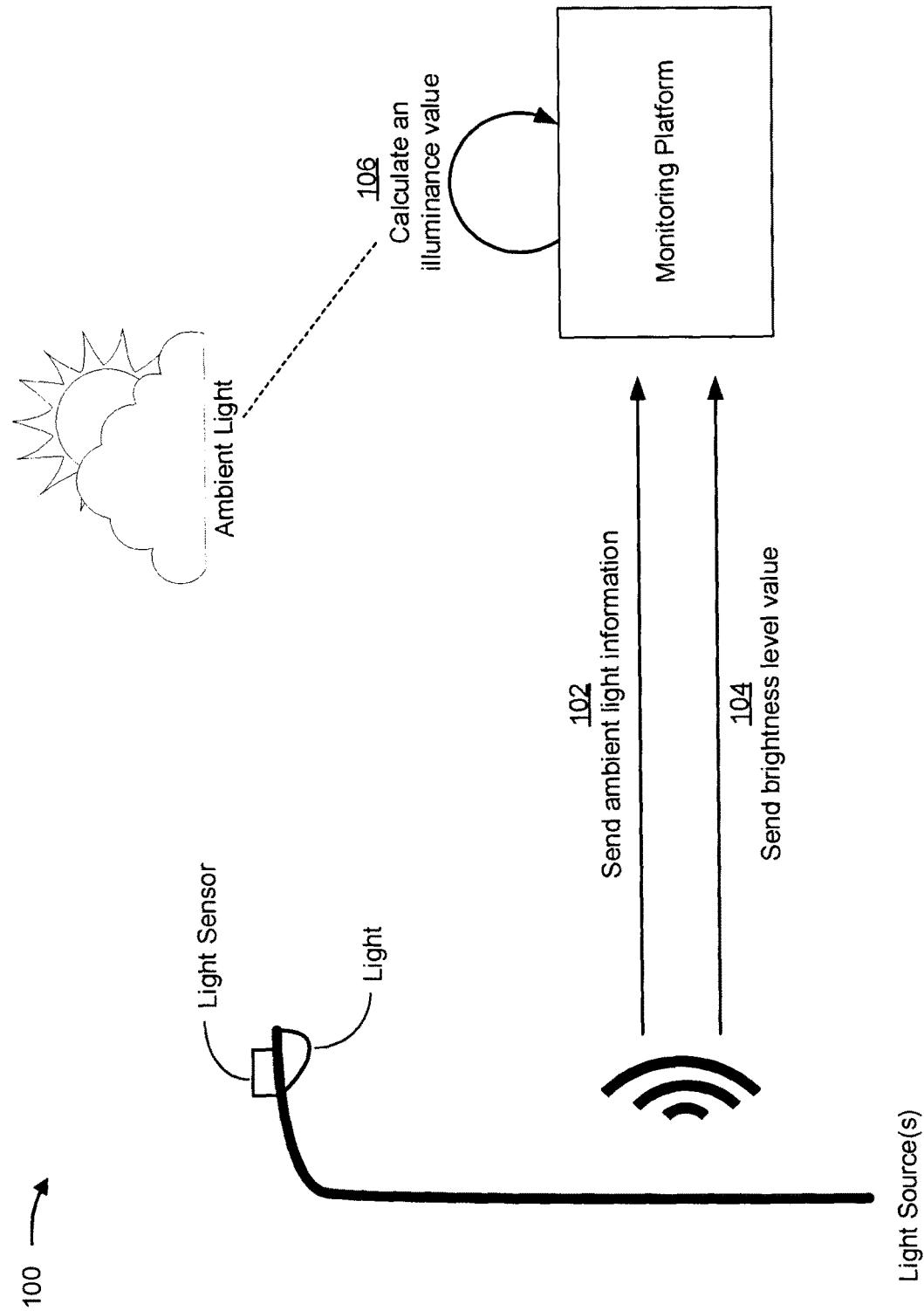

As shown in FIG. 1B the light source can send information, data, and/or the like to the monitoring platform. As shown by reference number 102, the light source can send (e.g., transmit via the network) the ambient light information to the monitoring platform. For example, the light source can send the information concerning luminance of the ambient light, the information concerning brightness of the ambient light, the information concerning illuminance of the ambient light, and/or the like to the monitoring platform. In some implementations, the light source can process the ambient light information (e.g., perform a debouncing function, a noise-reduction function, and/or the like) to reduce and/or remove noise and/or erroneous data associated with the ambient light information. As shown by reference number 104, the light source can send (e.g., transmit via the network) the brightness level value to the monitoring platform. In some implementations, the monitoring platform can obtain (e.g., receive, fetch, collect, capture, and/or the like) the ambient light information, the brightness level value, and/or the like from the light source.

In some implementations, the monitoring platform can periodically obtain the ambient light information, the brightness level value, and/or the like from the light source. For example, the monitoring platform can obtain the information on a scheduled basis (e.g., every 30 seconds, every minute, every 4 minutes, every 30 minutes, every hour, every 3 hours, every 5 hours, and/or the like). In some implementations, the monitoring platform can determine the schedule and obtain the ambient light information, the brightness level value, and/or the like from the light source according to the schedule. In some implementations, the schedule can indicate one or more polling intervals (e.g., a fast polling interval, a slow polling interval, an hourly polling interval, a 30-minute polling interval, an inactive interval, and/or the like). For example, the schedule can indicate a fast polling interval (e.g., a scheduled basis that includes intervals of time less than 5 minutes) for times when the ambient light generally changes quickly (e.g., a 90-minute period before sunrise, a 90-minute period after sunset, and/or the like), a slow polling interval (e.g., a scheduled basis that includes intervals of time greater than 1 hour) for times when the ambient light generally does not change (e.g., midday), and/or the like.

In some implementations, the monitoring platform can obtain the ambient light information, the brightness level value, and/or the like based on a trigger event. For example, the monitoring platform can monitor weather forecast information and send a fetch request to the light source upon a predicted low-light weather condition, such as cloudiness, thunderstorms, smog, and/or the like. As another example, the light source can send the ambient light information, the brightness level, and/or the like when the light sensor detects that the ambient light satisfies a threshold (e.g., the available light in the environment around the light sensor is greater than an ambient light level threshold, the available light in the environment around the light sensor is less than an ambient light level threshold, and/or the like). In some implementations, the monitoring platform can determine the threshold and send the threshold to the light source. In some implementations, the user device can obtain the measurement data on demand (e.g., based on a user request received by the monitoring platform from the client device). Accordingly, some implementations provided in here may reduce the amount of data that needs to be communicated between the light source and monitoring platform, which can conserve processing resources associated with the light source and/or monitoring platform, and/or can conserve networking resources dedicated to facilitating communication between the light source and the monitoring platform.

As shown by reference number 106, the monitoring platform can calculate an illuminance value associated with the illuminance of the ambient light. In some implementations, the monitoring platform can calculate the illuminance value associated with the illuminance of the ambient light based on the ambient light information. For example, in situations where the ambient light information is based on information from a single light sensor, the monitoring platform can parse the ambient light information to determine the illuminance value. As another example, in situations where the ambient light information is based on information from a plurality of light sensors of one or more light sources, the monitoring platform can parse the ambient light information, determine respective ambient light values associated with the one or more light sources (e.g., respective ambient light values that indicate a respective illuminance of the ambient light associated with the one or more light sources), and average the respective ambient light values associated with the one or more light sources to determine the illuminance value. In some implementations, the monitoring platform can average the respective ambient light values using a mathematical mean, a geometric mean, a harmonic mean, an interquartile mean, a truncated mean, and/or the like.

In some implementations, the monitoring platform can determine that the illuminance value satisfies a threshold for a period of time. In some implementations, the monitoring platform can change the schedule (e.g., increase a scheduled rate, decrease a scheduled rate, and/or the like) for when the monitoring platform obtains the ambient light information, the brightness level value, and/or the like from the light source based on determining that the illuminance value satisfies the threshold for the period of time.

Figure 1C:
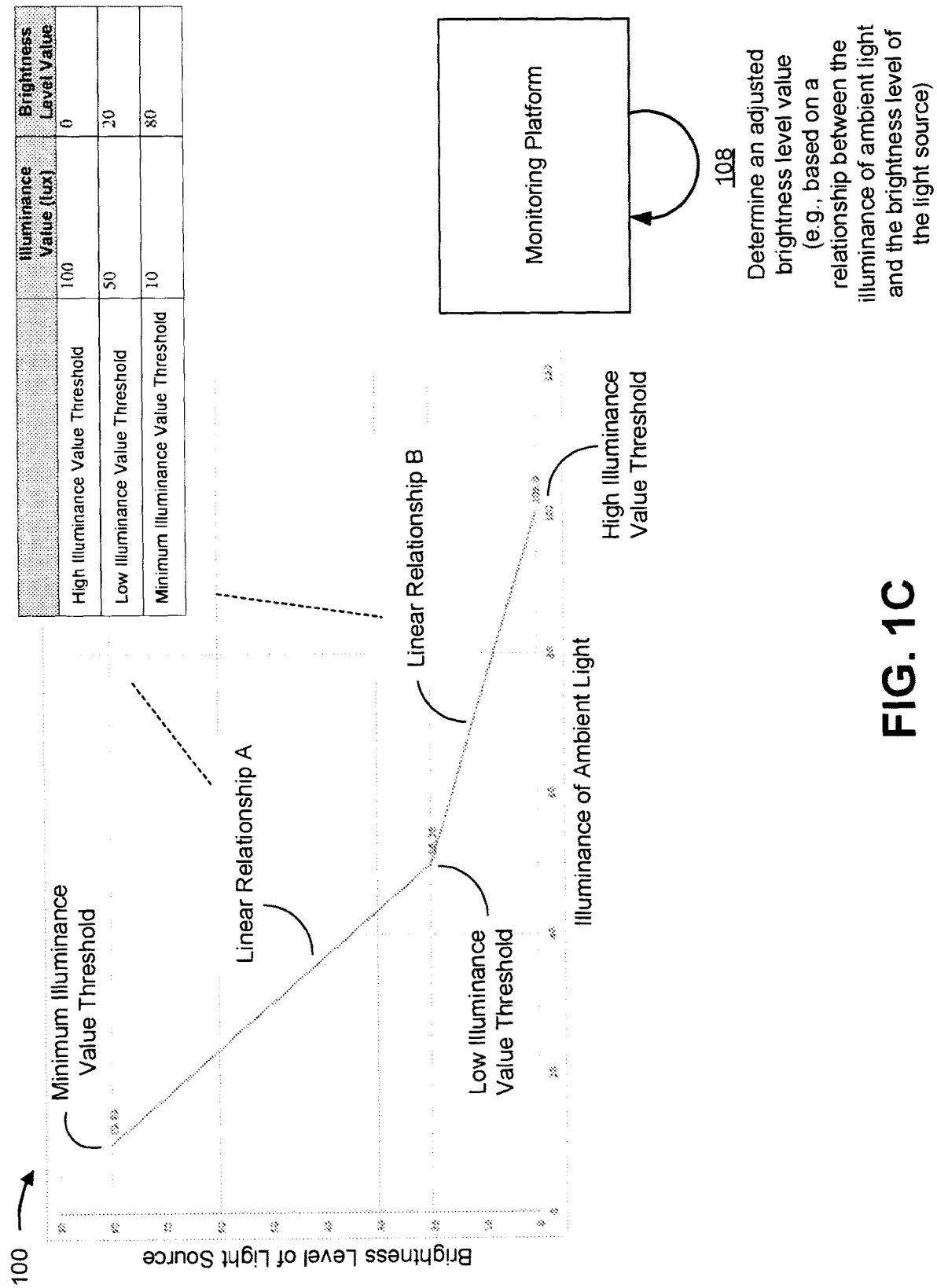

As shown in FIG. 1C and by reference number 108, the monitoring platform can determine an adjusted brightness level value (e.g., a brightness level value associated with a brightness level that corresponds to the illuminance value). In some implementations, the monitoring platform can determine the adjusted brightness level value based on the illuminance value. In some implementations, the monitoring platform can determine a relationship between the illuminance of the ambient light and a brightness level of the light source (e.g., the brightness level of the light of the light source). Accordingly, in some implementations, the monitoring platform can determine the adjusted brightness level value based on the illuminance value and the relationship (e.g., calculate the adjusted brightness level value by processing the illuminance value according to a formula that indicates the relationship).

In some implementations, the relationship can be a linear relationship, a nonlinear relationship (e.g., a quadratic relationship, an exponential relationship, and/or the like), and/or a combination of a linear relationship and a nonlinear relationship. In some implementations, the relationship can be a linear relationship for illuminance values that satisfy an illuminance value threshold. For example, as shown in FIG. 1C, the relationship can be a first linear relationship (e.g., shown as Linear Relationship A) for illuminance values that satisfy (e.g., are equal to or greater than) a minimum illuminance value threshold (e.g., shown as 10 lumens per square meter (lux)). In some implementations, the relationship can be a linear relationship for illuminance values that satisfy a first illuminance value threshold and a second illuminance value threshold. For example, as shown in FIG. 1C, the relationship can be a second linear relationship (e.g., shown as Linear Relationship B) for illuminance values that satisfy (e.g., are equal to or greater than) a low illuminance value threshold (e.g., shown as 50 lux) and that satisfy (e.g., are less than) a high illuminance value threshold (e.g., shown as 100 lux).

As shown in FIG. 1C, an illuminance value threshold can be associated with a brightness level value. As such, the monitoring platform can determine a linear relationship for luminance values between a first illuminance value threshold and a second illuminance value threshold based on the first illuminance value threshold, a first brightness level value associated with the first illuminance value threshold, the second illuminance value threshold, and a second brightness level value associated with the second illuminance value threshold. For example, as shown in FIG. 1C, the monitoring platform can determine the first linear relationship (shown as Linear Relationship A) by calculating the slope between the minimum illuminance value threshold and the low illuminance value threshold (e.g., dividing a mathematical difference of the respective brightness level values associated with the minimum illuminance value threshold and the low illuminance value threshold by a mathematical difference of the minimum illuminance value threshold and the low illuminance value threshold, i.e. (80−20)/(10−50)=−1.5). Accordingly, the monitoring platform can determine the adjusted brightness level value based on the first linear relationship for illuminance values between the minimum illuminance value threshold and the low illuminance value threshold. As another example, as shown in FIG. 1C, the monitoring platform can determine the second linear relationship (shown as Linear Relationship B) by calculating the slope between the low illuminance value threshold and the high illuminance value threshold (e.g., dividing a mathematical difference of the respective brightness level values associated with the low illuminance value threshold and the high illuminance value threshold by a mathematical difference of the low illuminance value threshold and the high illuminance value threshold, (i.e., (20−0)/(50−100)=−0.4). Accordingly, the monitoring platform can determine the adjusted brightness level value based on the second linear relationship for illuminance values between the low illuminance value threshold and the high illuminance value threshold.

Figure 1D:
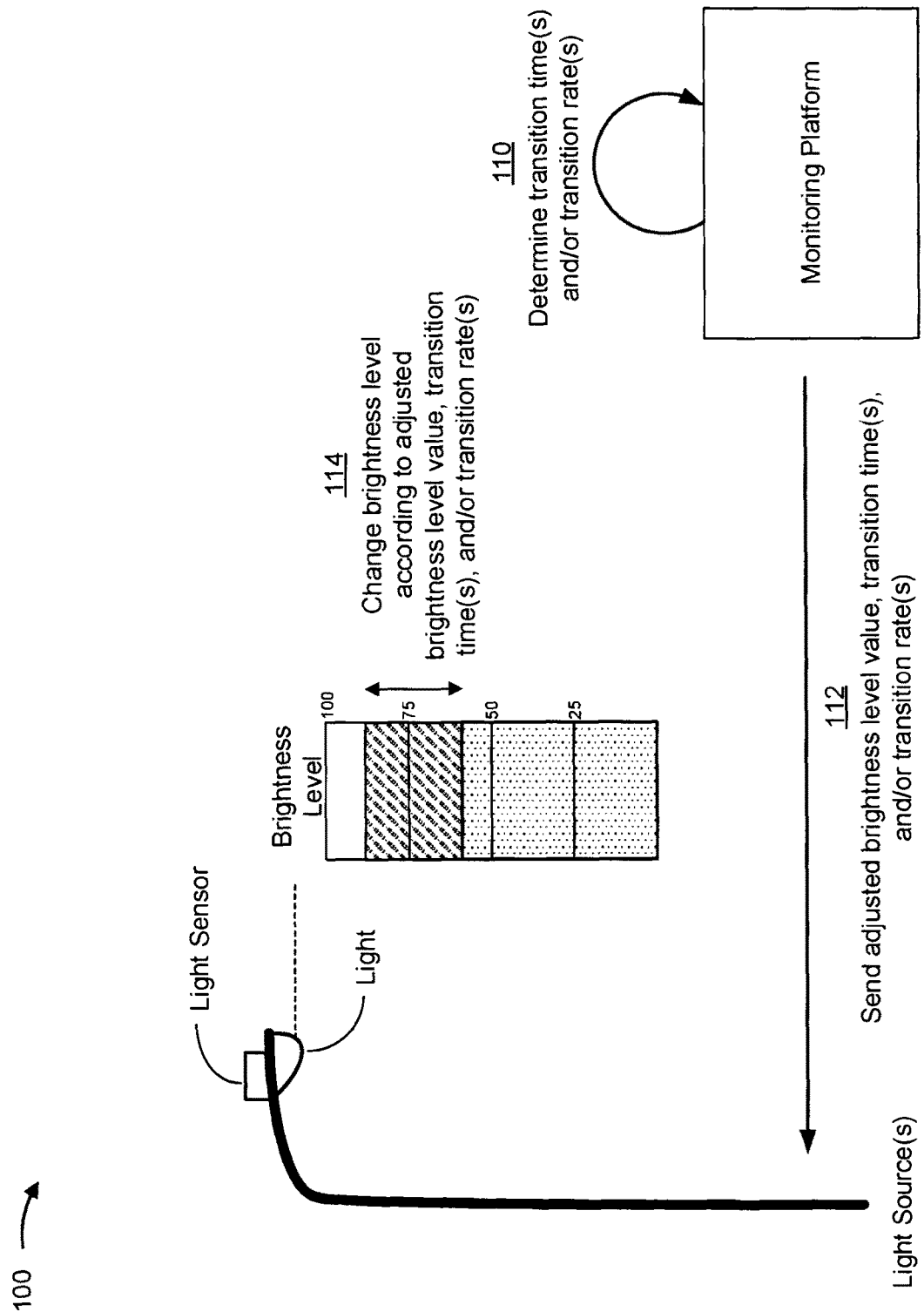

As shown in FIG. 1D, the monitoring platform can cause the light source to change the brightness level of the light. As shown by reference number 110, the monitoring platform can determine one or more transition times (e.g., one or more durations for changing the brightness level of the light from a first level to a second level) and/or one or more transition rates (e.g., one or more speeds for changing the brightness level of the light from the first level to the second level). In some implementations, the monitoring platform can determine the one or more transition times and the one or more transition rates based on the brightness level value and the adjusted brightness level value.

In some implementations, determining the one or more transition times and/or the one or more transition rates based on the brightness level value and the adjusted brightness level value includes calculating a difference between the brightness level value and the adjusted brightness level value. In some implementations, the monitoring platform can determine the one or more transition times and/or the one or more transition rates based on the difference. In some implementations, the monitoring platform can determine the one or more transition times based on the difference and the one or more transition rates.

In some implementations, the monitoring platform can process historical brightness level values, historical adjusted brightness level values, historical ambient light information, historical weather information, and/or the like to generate and/or train a machine learning model to predict and/or forecast the one or more transition times and/or the one or more transition rates.

In some implementations, the monitoring platform can perform a set of data manipulation procedures to process the historical brightness level values, the historical adjusted brightness level values, the historical ambient light information, the historical weather information, and/or the like to generate the machine learning model, such as a data preprocessing procedure, a model training procedure, a model verification procedure, and/or the like. For example, the monitoring platform can preprocess the historical brightness level values, the historical adjusted brightness level values, the historical ambient light information, the historical weather information, and/or the like to remove numbers and/or letters, non-ASCII characters, other special characters, white spaces, confidential data, and/or the like. In this way, the monitoring platform can organize thousands, millions, or billions of data entries for machine learning and model generation—a data set that cannot be processed objectively by a human actor.

In some implementations, the monitoring platform can perform a training operation when generating the machine learning model. For example, the monitoring platform can portion the historical brightness level values, the historical adjusted brightness level values, the historical ambient light information, the historical weather information, and/or the like into a training set, a validation set, a test set, and/or the like. In some implementations, the monitoring platform can train the machine learning model using, for example, an unsupervised training procedure and based on the training set of the data. In some implementations, the monitoring platform can perform dimensionality reduction to reduce the historical brightness level values, the historical adjusted brightness level values, the historical ambient light information, the historical weather information, and/or the like to a minimum feature set, thereby reducing processing to train the machine learning model, and can apply a classification technique, to the minimum feature set.

In some implementations, the monitoring platform can use a logistic regression classification technique to determine a categorical outcome (e.g., that particular historical brightness level values, particular historical adjusted brightness level values, particular historical ambient light information, particular historical weather information, and/or the like are associated with particular transition times and/or particular transition rates). Additionally, or alternatively, the monitoring platform can use a naïve Bayesian classifier technique. In this case, the monitoring platform can perform binary recursive partitioning to split the data of the minimum feature set into partitions and/or branches, and use the partitions and/or branches to perform predictions (e.g., that particular historical brightness level values, particular historical adjusted brightness level values, particular historical ambient light information, particular historical weather information, and/or the like are associated with particular transition times and/or particular transition rates). Based on using recursive partitioning, the monitoring platform can reduce utilization of computing resources relative to manual, linear sorting and analysis of data points, thereby enabling use of thousands, millions, or billions of data points to train the machine learning model, which can result in a more accurate machine learning model than using fewer data points.

Additionally, or alternatively, the monitoring platform can use a support vector machine (SVM) classifier technique to generate a non-linear boundary between data points in the training set. In this case, the non-linear boundary is used to classify test data (e.g., particular historical brightness level values, particular historical adjusted brightness level values, particular historical ambient light information, particular historical weather information, and/or the like) into a particular class (e.g., a class indicating that the particular historical brightness level values, the particular historical adjusted brightness level values, the particular historical ambient light information, the particular historical weather information, and/or the like is associated with particular transition times and/or particular transition rates).

Additionally, or alternatively, the monitoring platform can train the machine learning model using a supervised training procedure that includes receiving input to the model from a subject matter expert, which can reduce an amount of time, an amount of processing resources, and/or the like to train the machine learning model relative to an unsupervised training procedure. In some implementations, the monitoring platform can use one or more other model training techniques, such as a neural network technique, a latent semantic indexing technique, and/or the like. For example, the monitoring platform can perform an artificial neural network processing technique (e.g., using a two-layer feedforward neural network architecture, a three-layer feedforward neural network architecture, and/or the like) to perform pattern recognition with regard to patterns of particular historical brightness level values, particular historical adjusted brightness level values, particular historical ambient light information, particular historical weather information, and/or the like associated with particular transition times and/or particular transition rates. In this case, using the artificial neural network processing technique can improve an accuracy of the machine learning model generated by the monitoring platform by being more robust to noisy, imprecise, or incomplete data, and by enabling the monitoring platform to detect patterns and/or trends undetectable to human analysts or systems using less complex techniques.

Accordingly, the monitoring platform can use any number of artificial intelligence techniques, machine learning techniques, deep learning techniques, and/or the like to determine the one or more transition times and/or the one or more transition rates.

As shown by reference number 112, the monitoring platform can send (e.g., transmit via the network) the adjusted brightness level value, the one or more transition times, the one or more transition rates, and/or the like to the light source. In some implementations, the light source can obtain (e.g., receive, fetch, collect, capture, and/or the like) the adjusted brightness level value, the one or more transition times, the one or more transition rates, and/or the like from the monitoring platform.

As shown by reference number 114, the light source can change the brightness level of the light according to the adjusted brightness level value, the one or more transition times, the one or more transition rates, and/or the like. For example, the light source can adjust the brightness level of the light from the brightness level value to the adjusted brightness level value over the one or more transition times and/or at the one or more transition rates.

As indicated above, FIG. 1 is provided merely as an example. Other examples are possible and can differ from what was described with regard to FIG. 1.

Figure 2:
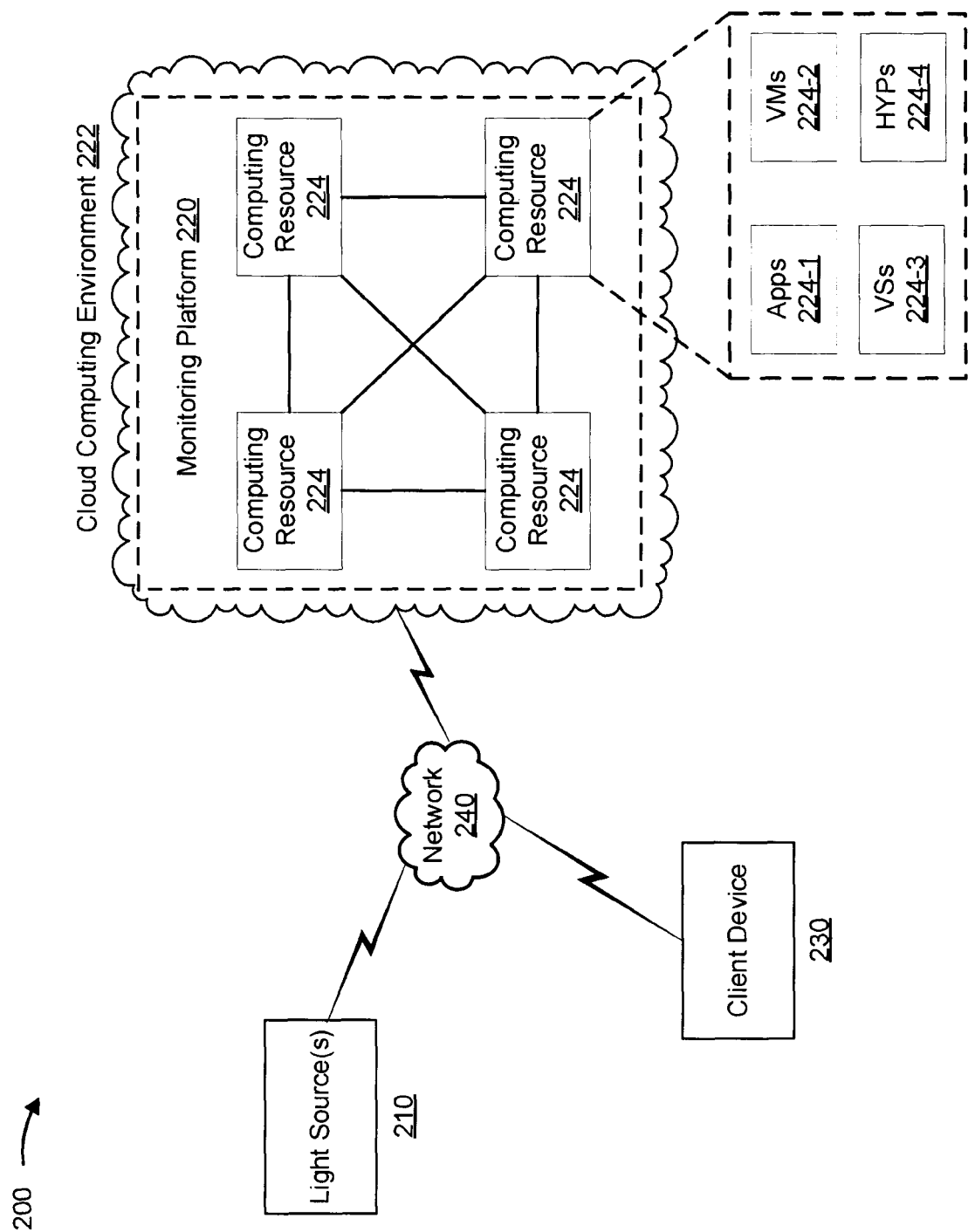
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a light source 210, a monitoring platform 220 in a cloud computing environment 222 that includes a set of computing resources 224, a client device 230, and a network 240. Devices of environment 200 can interconnect via wired connections, wireless connections, or a combination of wired and wireless connections.

Light source(s) 210 include one or more devices capable of providing illumination, such as a as a halogen light, an incandescent light, a compact fluorescent (CFL) light, a light emitting diode (LED) light, a florescent light, a neon light, and/or the like. In some implementations, light source 210 can include a light sensor (e.g., a photocell, a photo resistor, a photovoltaic cell, and/or the like) that can detect ambient light, collect ambient light information. and/or the like. In some implementations, light source 210 can provide ambient light information and/or a brightness level value to monitoring platform 220, can receive an adjusted brightness level, transition time(s), and/or transition rate(s) from monitoring platform 220, and/or the like. In some implementations, light source 210 can change a brightness level according to the adjusted brightness level value, transition time(s), and/or transition rate(s), and/or the like.

Monitoring platform 220 includes one or more devices that receive and process information associated with monitoring ambient light. For example, monitoring platform 220 can receive ambient light information and/or a brightness level value from light sensor 210, can calculate an illuminance value, can determine an adjusted brightness level value, and/or can send the adjusted brightness level value to light source 210. In some implementations, monitoring platform 220 can be designed to be modular such that certain software components can be swapped in or out depending on a particular need. As such, monitoring platform 220 can be easily and/or quickly reconfigured for different uses. In some implementations, monitoring platform 220 can receive information from and/or transmit information to multiple light sources 210.

In some implementations, as shown, monitoring platform 220 can be hosted in cloud computing environment 222. Notably, while implementations described herein describe monitoring platform 220 as being hosted in cloud computing environment 222, in some implementations, monitoring platform 220 might not be cloud-based (i.e., can be implemented outside of a cloud computing environment 222) or might be partially cloud-based.

Cloud computing environment 222 includes an environment that hosts monitoring platform 220. Cloud computing environment 222 can provide computation, software, data access, storage, etc. services that do not require end-user knowledge of a physical location and configuration of system(s) and/or device(s) that hosts monitoring platform 220. As shown, cloud computing environment 222 can include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 can host monitoring platform 220. The cloud resources can include compute instances executing in computing resource 224, storage devices provided in computing resource 224, data transfer devices provided by computing resource 224, and/or the like. In some implementations, computing resource 224 can communicate with other computing resources 224 via wired connections, wireless connections, or a combination of wired and wireless connections.

As further shown in FIG. 2, computing resource 224 includes a group of cloud resources, such as one or more applications ("Apps") 224-1, one or more virtual machines ("VMs") 224-2, virtualized storage ("VSs") 224-3, one or more hypervisors ("HYPs") 224-4, and/or the like.

Application 224-1 includes one or more software applications that can be provided to or accessed by light source 210 and/or client device 230. Application 224-1 can eliminate a need to install and execute the software applications on light source 210 and/or client device 230. For example, application 224-1 can include software associated with monitoring platform 220 and/or any other software capable of being provided via cloud computing environment 222. In some implementations, one application 224-1 can send/receive information to/from one or more other applications 224-1, via virtual machine 224-2.

Virtual machine 224-2 includes a software implementation of a machine (e.g., a computer) that executes programs like a physical machine. Virtual machine 224-2 can be either a system virtual machine or a process virtual machine, depending upon use and degree of correspondence to any real machine by virtual machine 224-2. A system virtual machine can provide a complete system platform that supports execution of a complete operating system ("OS"). A process virtual machine can execute a single program, and can support a single process. In some implementations, virtual machine 224-2 can execute on behalf of a user (e.g., client device 230 or an operator of monitoring platform 220), and can manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 224-4 can provide hardware virtualization techniques that allow multiple operating systems (e.g., "guest operating systems") to execute concurrently on a host computer, such as computing resource 224. Hypervisor 224-4 can present a virtual operating platform to the guest operating systems, and can manage the execution of the guest operating systems. Multiple instances of a variety of operating systems can share virtualized hardware resources.

Client device 230 includes one or more devices capable of receiving, generating, storing, processing, and/or providing information associated with ambient light monitoring of light source(s) 210. For example, client device 230 can include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, client device 230 can obtain information about light source 210 and/or information about monitoring platform 220. In some implementations, client device 230 can cause display of the information about the light source and/or the information about the monitoring platform to a user.

Network 240 includes one or more wired and/or wireless networks. For example, network 240 can include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
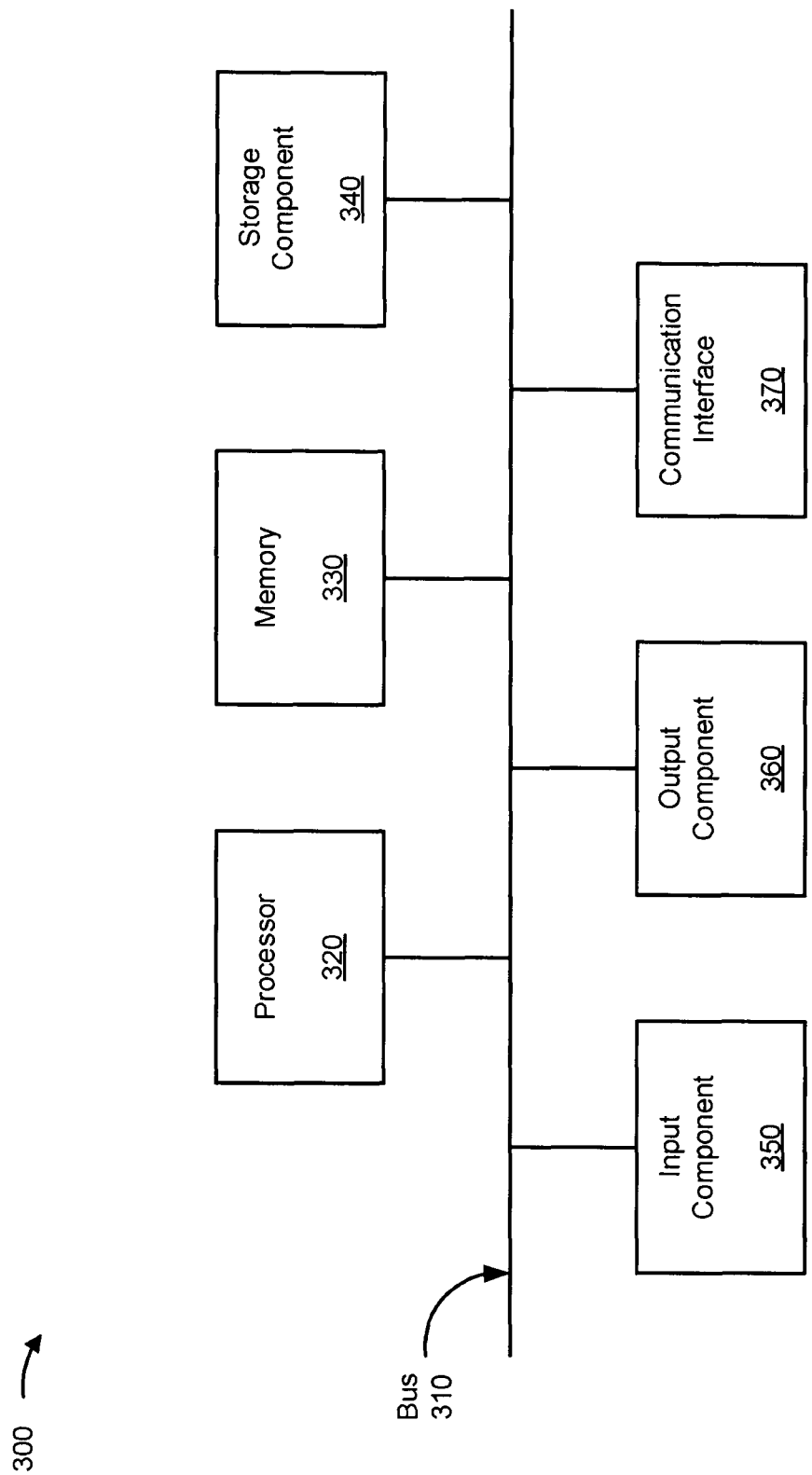
FIG. 3 is a diagram of example components of one or more devices of FIG. 2.

FIG. 3 is a diagram of example components of a device 300. Device 300 can correspond to light source(s) 210, monitoring platform 220, computing resource 224, and/or client device 230. In some implementations, light source(s) 210, monitoring platform 220, computing resource 224, and/or client device 230 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
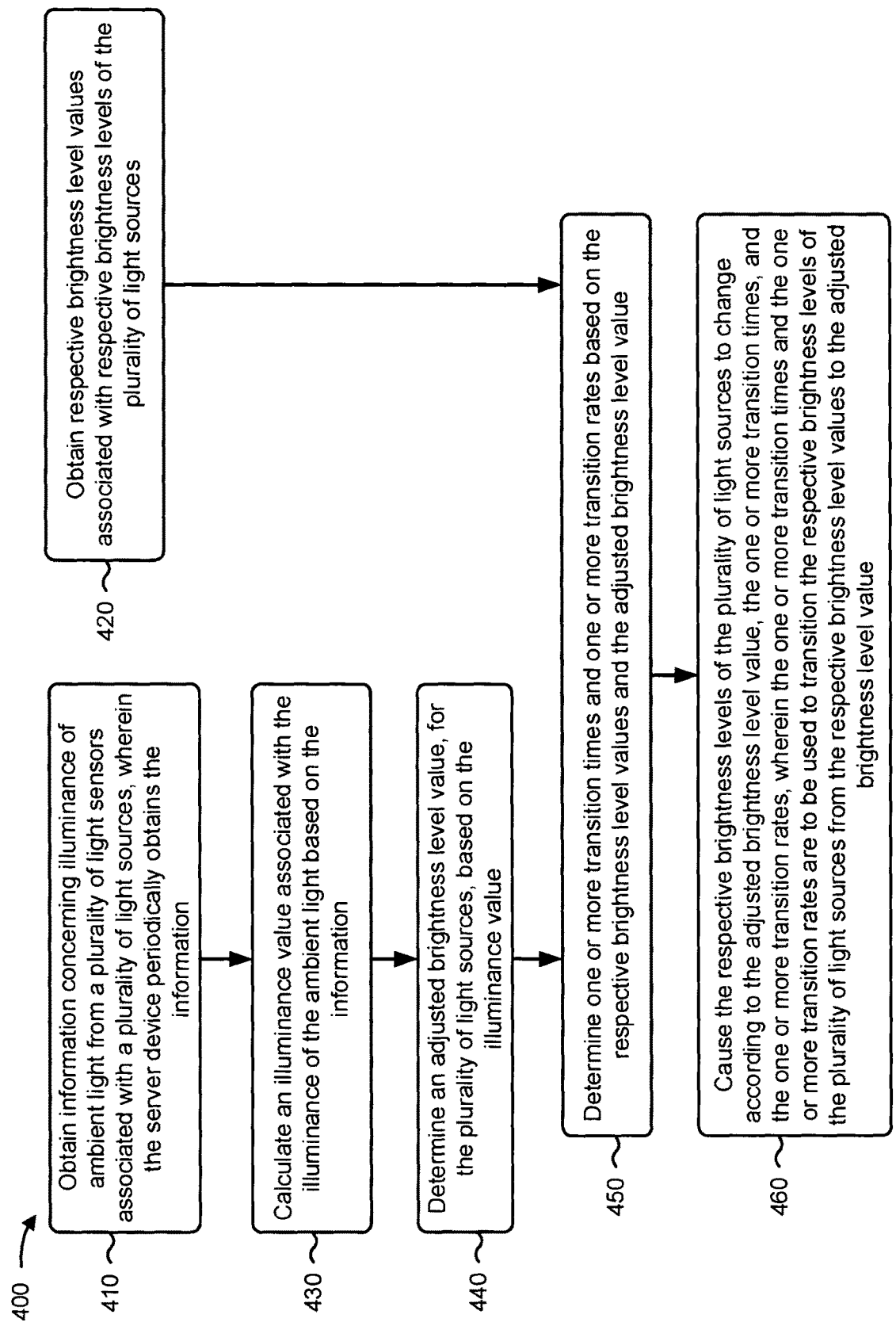
FIG. 4 is a flow chart of an example process for causing a brightness level of a light to change.

FIG. 4 is a flow chart of an example process 400 for causing a brightness level of a light to change. In some implementations, one or more process blocks of FIG. 4 can be performed by a server device such as a monitoring platform (e.g., monitoring platform 220). In some implementations, one or more process blocks of FIG. 4 can be performed by another device or a group of devices separate from or including the monitoring platform, such as a light source (e.g., light source 210), a client device (e.g., client device 230), and/or the like.

As shown in FIG. 4, process 400 can include obtaining information concerning illuminance of ambient light from a plurality of light sensors associated with a plurality of light sources, wherein the server device periodically obtains the information (block 410). For example, the monitoring platform (e.g., using computing resource 224, processor 320, memory 330, storage component 340, input component 350, communication interface 370, and/or the like) can obtain information concerning illuminance of ambient light from a plurality of light sensors associated with a plurality of light sources, as described above in connection with FIGS. 1A-1D. In some implementations, the server device can periodically obtain the information.

As further shown in FIG. 4, process 400 can include obtaining respective brightness level values associated with respective brightness levels of the plurality of light sources (block 420). For example, the monitoring platform (e.g., using computing resource 224, processor 320, memory 330, storage component 340, input component 350, communication interface 370, and/or the like) can obtain respective brightness level values associated with respective brightness levels of the plurality of light sources, as described above in connection with FIGS. 1A-1D.

As further shown in FIG. 4, process 400 can include calculating an illuminance value associated with the illuminance of the ambient light based on the information (block 430). For example, the monitoring platform (e.g., using computing resource 224, processor 320, memory 330, storage component 340, and/or the like) can calculate an illuminance value associated with the illuminance of the ambient light based on the information, as described above in connection with FIGS. 1A-1D.

As further shown in FIG. 4, process 400 can include determining an adjusted brightness level value, for the plurality of light sources, based on the illuminance value (block 440). For example, the monitoring platform (e.g., using computing resource 224, processor 320, memory 330, storage component 340, and/or the like) can determine an adjusted brightness level value, for the plurality of light sources, based on the illuminance value, as described above in connection with FIGS. 1A-1D.

As further shown in FIG. 4, process 400 can include determining one or more transition times and one or more transition rates based on the respective brightness level values and the adjusted brightness level value (block 450). For example, the monitoring platform (e.g., using computing resource 224, processor 320, memory 330, storage component 340, and/or the like) can determine one or more transition times and one or more transition rates based on the respective brightness level values and the adjusted brightness level value, as described above in connection with FIGS. 1A-1D.

As further shown in FIG. 4, process 400 can include causing the respective brightness levels of the plurality of light sources to change according to the adjusted brightness level value, the one or more transition times, and the one or more transition rates, wherein the one or more transition times and the one or more transition rates are to be used to transition the respective brightness levels of the plurality of light sources from the respective brightness level values to the adjusted brightness level value (block 460). For example, the monitoring platform (e.g., using computing resource 224, processor 320, memory 330, storage component 340, output component 360, communication interface 370, and/or the like) can cause the respective brightness levels of the plurality of light sources to change according to the adjusted brightness level value, the one or more transition times, and the one or more transition rates, as described above in connection with FIGS. 1A-1D. In some implementations, the one or more transition times and the one or more transition rates can be used to transition the respective brightness levels of the plurality of light sources from the respective brightness level values to the adjusted brightness level value.

Process 400 can include additional implementations, such as any single implementation or any combination of implementations described below and/or in connection with one or more other processes described elsewhere herein.

In some implementations, when determining the adjusted brightness level value, for the plurality of light sources, based on the illuminance value, the monitoring platform can determine a linear relationship between the illuminance of the ambient light and the respective brightness levels of the plurality of light sources, and can determine the adjusted brightness level value based on the linear relationship and the illuminance value.

In some implementations, when determining the adjusted brightness level value, for the plurality of light sources, based on the illuminance value, the monitoring platform can determine that the illuminance value satisfies an illuminance value threshold, and determine the adjusted brightness level value based on the illuminance value and a relationship between the illuminance of the ambient light and the respective brightness levels of the plurality of light sources, where the relationship is linear for illuminance values that satisfy the illuminance value threshold.

In some implementations, when determining the adjusted brightness level value, for the plurality of light sources, based on the illuminance value, the monitoring platform can obtain a first illuminance value threshold and a second illuminance value threshold, and obtain a first brightness level value and a second brightness level value, where the first brightness level value is associated with the first illuminance value threshold and the second brightness level value is associated with the second illuminance value threshold. Additionally, the monitoring platform can determine a linear relationship between the illuminance of the ambient light and the respective brightness levels of the plurality of light sources based on the first brightness level value, the first illuminance value threshold, the second brightness level value, and the second illuminance value threshold; can determine that the illuminance value satisfies the first illuminance value threshold and the second illuminance value threshold; and can determine the adjusted brightness level value based on the linear relationship and the illuminance value.

In some implementations, when calculating the illuminance value based on the information, the monitoring platform can determine respective ambient light values associated with the plurality of light sensors, and can average the respective ambient light values associated with the plurality of light sensors using an interquartile mean.

In some implementations, when determining the one or more transition times and the one or more transition rates based on the respective brightness level values and the adjusted brightness level value, the monitoring platform can calculate a difference between the respective brightness level values and the adjusted brightness level value, can determine the one or more transition rates based on the difference, and determine the one or more transition times based on the difference and the one or more transition rates.

In some implementations, the monitoring platform can determine that the illuminance value satisfies a threshold for a period of time, and can increase a rate at which information is obtained from the plurality of light sensors based on determining that the illuminance value satisfies the threshold for the period of time.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   obtaining, by a server device, one or more measures of ambient light from one or more light sensors associated with a plurality of light sources;
   calculating, by the server device, an illuminance value based on the one or more measures of ambient light;
   obtaining, by the server device, respective brightness level values associated with respective brightness levels of the plurality of light sources;
   determining, by the server device, at least one adjusted brightness level value, for the plurality of light sources, based on the illuminance value;
   determining, by the server device and based on the respective brightness level values and the at least one adjusted brightness level value, at least one of:
   one or more transition times, or
   one or more transition rates; and
   causing, by the server device, the respective brightness level values of the plurality of light sources to change according to the at least one adjusted brightness level value and the at least one of the one or more transition times or the one or more transition rates.

2. The method of claim 1, further comprising:
   receiving, from a client device, a request associated with the plurality of light sources; and
   providing, to the client device and based on the request, data indicating at least one of:
   the one or more measures of ambient light,
   the illuminance value,
   the respective brightness level values,
   the at least one adjusted brightness level value,
   the one or more transition times, or
   the one or more transition rates.

3. The method of claim 1, wherein:
   the plurality of light sources are included in a group of light sources monitored by the server device; and
   the method further comprises:
   monitoring, by the server device, at least one other group of light sources.

4. The method of claim 1, further comprising:
   performing, prior to calculating the illuminance value, one or more noise reduction functions on the one or more measures of ambient light.

5. The method of claim 1, wherein obtaining the one or more measures of ambient light comprises:
   periodically obtaining the one or more measures of ambient light according to a schedule,
   wherein the schedule specifies at least two different polling intervals.

6. The method of claim 1, wherein determining the at least one adjusted brightness level values comprises:
   determining the at least one adjusted brightness level value based on a linear relationship between the respective brightness level values and the illuminance value.

7. The method of claim 1, further comprising:
   generating a machine learning model based on historical brightness level values, historical adjusted brightness level values, and historical measurements of ambient light, the machine learning model being trained to predict one or more of:
predicted transition times, or
predicted transition rates; and
wherein determining the at least one of the one or more transition times or the one or more transition rates comprises:
determining the at least one of the one or more transition times or the one or more transition rates using the machine learning model.

8. A device, comprising:
one or more memories; and
one or more processors communicatively coupled to the one or more memories, configured to:
obtain one or more measures of ambient light from one or more light sensors associated with a plurality of light sources;
calculate an illuminance value based on the one or more measures of ambient light;
obtain respective brightness level values associated with respective brightness levels of the plurality of light sources;
determine at least one adjusted brightness level value, for the plurality of light sources, based on the illuminance value;
determine, based on the respective brightness level values and the at least one adjusted brightness level value, at least one of:
one or more transition times, or
one or more transition rates; and
cause the respective brightness level values of the plurality of light sources to change according to the at least one adjusted brightness level value and the at least one of the one or more transition times or the one or more transition rates.

9. The device of claim 8, wherein the one or more processors are further configured to:
receive, from a client device, a request associated with the plurality of light sources; and
provide, to the client device and based on the request, data indicating at least one of:
the one or more measures of ambient light,
the illuminance value,
the respective brightness level values,
the at least one adjusted brightness level value,
the one or more transition times, or
the one or more transition rates.

10. The device of claim 8, wherein:
the plurality of light sources are included in a group of light sources monitored by the device; and
the one or more processors are further configured to:
monitor at least one other group of light sources.

11. The device of claim 8, wherein the one or more processors are further configured to:
perform, prior to calculating the illuminance value, one or more noise reduction functions on the one or more measures of ambient light.

12. The device of claim 8, wherein the one or more processors, when obtaining the one or more measures of ambient light, are configured to:
periodically obtain the one or more measures of ambient light according to a schedule,
wherein the schedule specifies at least two different polling intervals.

13. The device of claim 8, wherein the one or more processors, when determining the at least one adjusted brightness level value, are configured to:

determine the at least one adjusted brightness level value based on a linear relationship between the respective brightness level values and the illuminance value.

14. The device of claim 8, wherein the one or more processors are further configured to:
generate a machine learning model based on historical brightness level values, historical adjusted brightness level values, and historical measurements of ambient light,
the machine learning model being trained to predict one or more of:
predicted transition times, or
predicted transition rates; and
wherein the one or more processors, when determine the at least one of the one or more transition times or the one or more transition rates, are configured to:
determine the at least one of the one or more transition times or the one or more transition rates using the machine learning model.

15. A non-transitory computer-readable medium storing instructions, the instructions comprising:
one or more instructions that, when executed by one or more processors of a device, cause the one or more processors to:
obtain one or more measures of ambient light from one or more light sensors associated with a plurality of light sources;
calculate an illuminance value based on the one or more measures of ambient light;
obtain respective brightness level values associated with respective brightness levels of the plurality of light sources;
determine at least one adjusted brightness level value, for the plurality of light sources, based on the illuminance value;
determine, based on the respective brightness level values and the at least one adjusted brightness level value, at least one of:
one or more transition times, or
one or more transition rates; and
cause the respective brightness level values of the plurality of light sources to change according to the at least one adjusted brightness level value and the at least one of the one or more transition times or the one or more transition rates.

16. The non-transitory computer-readable medium of claim 15, wherein the one or more instructions, when executed by the one or more processors, further cause the one or more processors to:
receive, from a client device, a request associated with the plurality of light sources; and
provide, to the client device and based on the request, data indicating at least one of:
the one or more measures of ambient light,
the illuminance value,
the respective brightness level values,
the at least one adjusted brightness level value,
the one or more transition times, or
the one or more transition rates.

17. The non-transitory computer-readable medium of claim 15, wherein:
the plurality of light sources are included in a group of light sources monitored by the device; and
the one or more instructions, when executed by the one or more processors, further cause the one or more processors to:
monitor at least one other group of light sources.

18. The non-transitory computer-readable medium of claim 15, wherein the one or more instructions, when executed by the one or more processors, further cause the one or more processors to:
perform, prior to calculating the illuminance value, one or more noise reduction functions on the one or more measures of ambient light.

19. The non-transitory computer-readable medium of claim 15, wherein the one or more instructions, that cause the one or more processors to obtain the one or more measures of ambient light, cause the one or more processors to:
periodically obtain the one or more measures of ambient light according to a schedule,
wherein the schedule specifies at least two different polling intervals.

20. The non-transitory computer-readable medium of claim 15, wherein the one or more instructions, that cause the one or more processors to determine the at least one adjusted brightness level value, cause the one or more processors to:
determine the at least one adjusted brightness level value based on a linear relationship between the respective brightness level values and the illuminance value.

* * * * *